Jan. 15, 1935   F. O. CARLSON   1,988,428
RULER TAPE
Filed Feb. 21, 1931   2 Sheets-Sheet 1

INVENTOR
Frederick O. Carlson
BY Janney, Blair & Curtis
ATTORNEYS

Jan. 15, 1935.  F. O. CARLSON  1,988,428
RULER TAPE
Filed Feb. 21, 1931   2 Sheets-Sheet 2

INVENTOR
Frederick O. Carlson
BY Janney, Blair & Curtis
ATTORNEYS

Patented Jan. 15, 1935

1,988,428

UNITED STATES PATENT OFFICE 1,988,428

RULER TAPE

Frederick O. Carlson, Shelburne Falls, Mass.

Application February 21, 1931, Serial No. 517,381

10 Claims. (Cl. 33—138)

This invention relates to ruler tapes and particularly to ruler tapes having a capacity and a tendency to assume a straight line formation.

It is an object of the invention to provide a holder for such a tape into which the tape may be readily pushed and coiled therein, and from which the tape may be readily pulled for measuring purposes. The combination of such a ruler tape and holder is commonly referred to as a "push-pull ruler."

In rulers of the push-pull type, as heretofore constructed, the tape has been coiled about a drum having a fixed center of rotation, and means have been provided to confine the coiled tape about the drum in such a way as to permit an easy coiling of the tape within the holder while at the same time restraining the tape from projecting itself out of the holder. Heretofore such confining means have taken the form of spring-pressed rollers or the like which have been objectionable because they required accurate adjustment for efficient results, and also because the spring pressures varied in use.

The present invention contemplates a floating drum or reel for the tape; and a confining means for the coiled tape which moves with the coil during its coiling or uncoiling, accompanies the floating movement of the coil, and expands in response to an increase in the diameter of the coil when the tape is pushed into the holder.

One illustrative embodiment of the invention is shown in the accompanying drawings, in which:—

Figure 1:
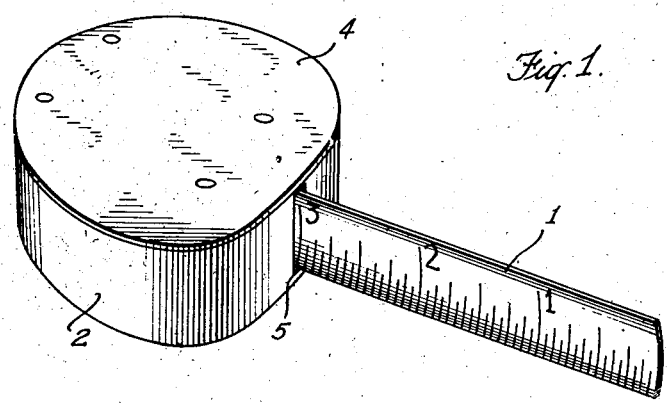
Figure 1 is a perspective view of a ruler tape and holder embodying the invention.

Referring to Fig. 1, the ruler tape which is designated by the reference numeral 1, is preferably made of steel and is concavo-convex in cross-section to give it the tendency and capacity to expand and assume a straight line formation.

Figure 3:
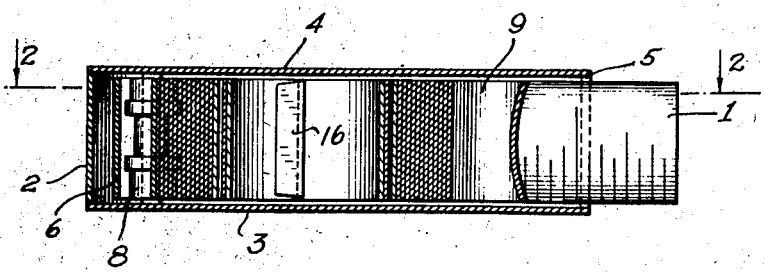
Fig. 3 is a sectional view taken on the line 3—3 of Fig. 2.

As shown in Fig. 3, the holder may consist of a side wall 2, a bottom wall 3, and a top wall 4. Side wall 2 is provided with a guide opening 5 to guide the tape into and out of the holder.

Figure 2:
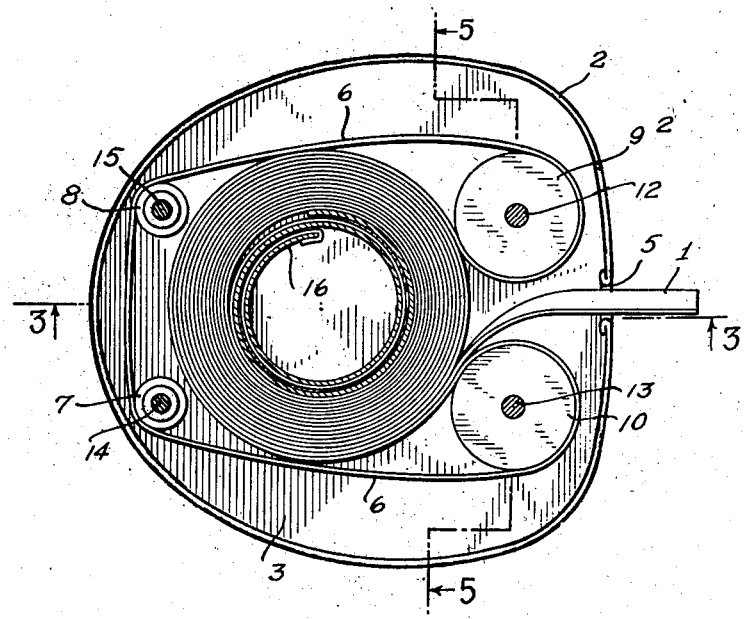
Fig. 2 is an enlarged horizontal section of the same taken on line 2—2 of Figure 3 with certain parts shown in plan and also showing a large portion of the ruler tape coiled in the holder.

Referring to Fig. 2, the confining means for the coiled tape consists of an endless band 6 of tempered steel or the like, which passes over rollers 7 and 8 at the left hand side of the figure, over larger rollers 9 and 10 at the right hand side of the figure, and thence around the coiled tape located, as shown, within the four rollers 7, 8, 9 and 10. The confining band 6 is long enough to accommodate within its inner loop, the large coil of tape shown in Fig. 2,—the outer loop of the band 6 being drawn inwardly between the rollers 9 and 10 as the coil expands in diameter. Rollers 9 and 10 are rotatably mounted respectively on spindles 12 and 13 supported in the upper and lower walls of the holder. Rollers 7 and 8 are rotatably mounted respectively on spindles 14 and 15 similarly supported by the upper and lower walls of the holder.

Figure 4:
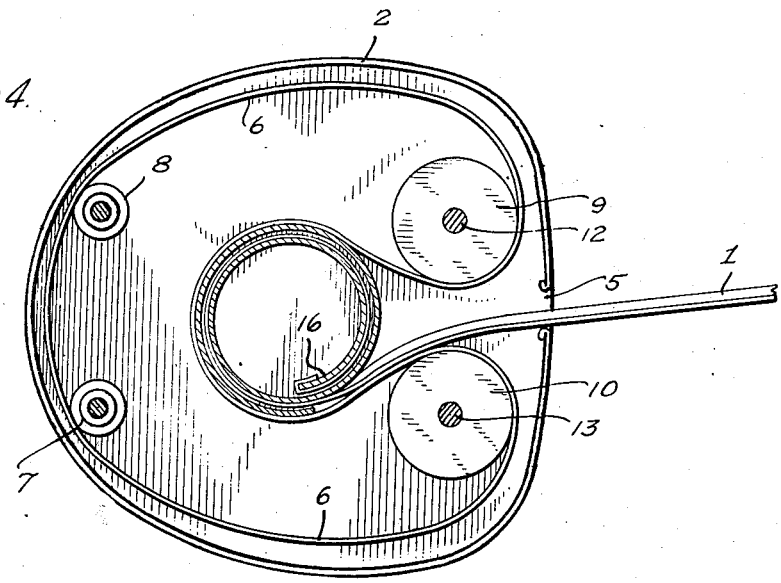
Fig. 4 is the same as Fig. 2, but showing most of the tape pulled out of the holder.
Figure 5:
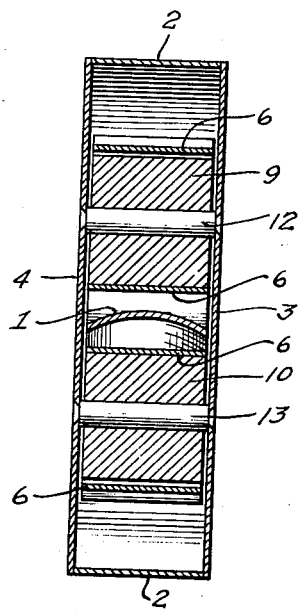
Fig. 5 is a sectional view taken on the line 5—5 of Fig. 2.

Referring to Fig. 4, the inner end of the tape is secured to a floating drum or ring 16, about which the tape is coiled within the inner loop of the confining belt 6, which is normally in the position shown in Fig. 4. As additional tape is pushed into the holder the frictional contact between the outer convolution of the coiled tape and the confining band 6 causes the band 6 to move with the coil, and, as additional tape is pushed into the holder and the diameter of the coil expands, the inner loop portion of the confining band expands correspondingly until the tape is completely coiled within the inner loop of the confining band, as shown in Fig. 2. As there shown, the expansion of the inner loop of the band 6 reduces the diameter of the outer loop of the band which passes around the rollers 7, 8, 9 and 10 and tightens the outer loop of the band over said rollers. As the tendency of the confining band thus tensioned is to resume the position shown in Fig. 4, the inner loop of the band which is in contact with the coiled tape will exert sufficient confining pressure on the coil to prevent it from projecting itself from the holder, while at the same time permitting a ready pushing or pulling of the tape into or out of the holder, the inner loop of the confining belt automatically accommodating itself to changes in the diameter of the coil. Thus the confining band constitutes a flexible and elastic confining means for the coiled tape, and its movement with the tape eliminates relative movement between the coil and its confining means, thereby preserving the tape against scratching or marking, which sometimes results in other push-pull types of ruler. Further, the confining band, or belt, serves to hold said drum to substantially one degree of movement in the plane of the base of the housing (e. g. a horizontal plane) but permits rotational movement thereof to coil or uncoil the tape. The confining pressure with which the tape holds the drum to this one degree of movement is resilient.

In the illustrative embodiment of the invention, the inner end of the coiled tape is free from attachment to a post or drum having a fixed center, and, as a result, the coiled tape is confined solely by the action of the confining belt 6. Thus the coil is free to shift with the confining belt 6 within the limits defined by the four rollers 7, 8, 9 and 10. This arrangement, which permits a "floating" of the coil within the holder, tends to reduce binding contact between convolutions of the coil such as might interfere with the ready coiling and uncoiling of the tape. It will be understood, however, that the invention is not to be limited to the particular embodiment shown for illustration, nor, in its broader aspects, to a holder having a floating drum.

I claim:

1. The combination of a flexible ruler tape having a tendency and the capacity when coiled, to uncoil and assume a straight line formation, and a holder therefor; said holder including a floating drum to which the inner end of the tape is secured and about which the tape may be coiled, a plurality of rollers located radially of the drum and spaced to accommodate within their confines the drum and tape coiled thereon, and a tape confining means comprising an endless resilient flexible belt passing over the rollers, and also between the rollers and drum, and substantially around the tape coiled on the drum, said belt being capable of expanding and contracting about the coiled tape in accordance with variations in the diameter of the coil while exerting a confining pressure on the coil.

2. The combination of a flexible ruler tape having a tendency and the capacity when coiled, to uncoil and assume a straight line formation, and a holder therefor; said holder including a drum to which the inner end of the tape is secured and about which the tape may be coiled, a plurality of rollers located radially of the drum and spaced to accommodate within their confines the drum and tape coiled thereon, and an endless resilient flexible belt passing over the rollers, and also between the rollers and drum, and substantially around the tape coiled on the drum, and said belt being capable of resiliently holding said drum to substantially one degree of movement in a horizontal plane while permitting rotational movement thereof to coil or uncoil the tape.

3. The combination of a flexible ruler tape having a tendency and the capacity when coiled, to uncoil and assume a straight line formation, and a holder therefor; said holder including a floating drum to which the end of the tape is secured and about which the tape may be coiled, and a flexible resilient endless belt for resiliently holding said drum to substantially one degree of movement in a horizontal plane and for resiliently pressing the coiled tape against the drum as the drum rotates to coil or uncoil the tape.

4. The combination of a flexible ruler tape having a tendency and the capacity when coiled, to uncoil and assume a straight line formation, and a holder therefor; said holder including a drum to which the inner end of the tape is secured and about which the tape may be coiled, and a resilient endless belt substantially surrounding said drum and confining the coiled tape about the drum, and said belt expanding and contracting about the coil in accordance with variations in the diameter of the coil.

5. The combination of a flexible ruler having a tendency when coiled to uncoil, and a holder therefor; said holder including a housing, a floating drum about which said tape may be coiled, and resilient means for pressing the coils of said tape against said drum, said resilient means being substantially non-frictionally mounted with respect to said housing, and adapted to move with the outer coil during the coiling and uncoiling operations.

6. The combination of a flexible ruler tape having a tendency when coiled to uncoil, and a holder therefor; said holder including a housing, a floating drum in said housing about which said tape may be coiled, a resilient means comprising an endless belt for guiding said drum within said housing, means for non-frictionally supporting said belt with respect to said housing; whereby said belt contacting with the outer coil of the tape coiled about the drum moves therewith as the tape is coiled and uncoiled.

7. The combination of a flexible ruler tape having a tendency when coiled to uncoil, and a holder therefor; said holder including a housing, a floating drum in said housing about which said tape may be coiled, and a resilient endless outwardly expansible belt looped about said drum.

8. In combination, a flexible ruler tape having a tendency when coiled to uncoil, a holder therefor; said holder including a drum, comprising a plurality of coils of a substantially rigid metal strip, the inner end portion of said tape being positioned between the respective coils of said drum whereby the end of the tape is secured to said drum, a housing, and resilient means for causing the tape to coil about said drum as said tape is fed into said housing, and for holding the coiled tape against said drum.

9. In combination, a flexible ruler tape having a tendency when coiled to uncoil, a holder therefor comprising a housing, a floating drum in said housing, a resilient endless belt movably mounted in said housing, partially surrounding said drum and adapted resiliently to force the tape coiled about said drum toward the outer surface thereof regardless of the number of coils of tape on said drum, and the portions of said endless belt contacting with the outer coil of said tape moving therewith whereby no sliding contact exists between the belt and said tape.

10. A ruler assembly comprising, in combination, a housing, a flexible ruler tape having a tendency when coiled to uncoil, a holder therefor, said holder including a floating drum comprising a coiled metal strip having overlapping portions, the inner end portion of said tape extending and being held between said overlapping portions, and resilient means for causing the tape to coil about said drum as said tape is fed into said housing.

FREDERICK O. CARLSON.